US008576427B2

(12) United States Patent
Sakai et al.

(10) Patent No.: US 8,576,427 B2
(45) Date of Patent: Nov. 5, 2013

(54) IMAGE FORMING APPARATUS IMPLEMENTED BY A DISTRIBUTED CONTROL SYSTEM

(75) Inventors: Akihiko Sakai, Abiko (JP); Atsushi Otani, Moriya (JP); Shigeo Hata, Toride (JP); Shoji Takeda, Tokyo (JP); Satoru Yamamoto, Abiko (JP); Keita Takahashi, Abiko (JP); Hirotaka Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 611 days.

(21) Appl. No.: 12/713,129

(22) Filed: Feb. 25, 2010

(65) Prior Publication Data

US 2010/0231962 A1 Sep. 16, 2010

(30) Foreign Application Priority Data

Mar. 12, 2009 (JP) ................................ 2009-060115

(51) Int. Cl.
*G06F 3/12* (2006.01)

(52) U.S. Cl.
USPC ........................... 358/1.15; 358/443; 358/468

(58) Field of Classification Search
USPC ........ 358/1.1, 1.12, 1.15, 400, 401, 443, 468, 358/498, 296
See application file for complete search history.

(56) References Cited

U.S. PATENT DOCUMENTS 5,138,376 A 8/1992 Maruta et al.
5,398,305 A * 3/1995 Yawata et al. .................. 358/1.1
6,292,741 B1 9/2001 Bitzer
6,788,434 B1 9/2004 Kanematsu et al.
7,336,380 B2 * 2/2008 Eisele .......................... 358/1.15
2002/0109869 A1 8/2002 Eisele
2007/0086037 A1 4/2007 Kitahara

FOREIGN PATENT DOCUMENTS

JP 2734533 B 3/1998
JP 2000-071819 A 3/2000
JP 2004-237469 A 8/2004
JP 2006-171960 A 6/2006
JP 2006-256275 A 9/2006
JP 2007-65462 A 3/2007

OTHER PUBLICATIONS

Office Action issued on Dec. 27, 2011, concerning corresponding Chinese Patent Application No. 201010132770.3.

* cited by examiner

*Primary Examiner* — Thomas D Lee
(74) *Attorney, Agent, or Firm* — Fitzpatrick, Cella, Harper & Scinto

(57) ABSTRACT

There are provided an image forming apparatus which implements divisional control using a plurality of control units without an increase in cost and a control method for the apparatus. To accomplish this, this image forming apparatus includes a master control unit that controls the overall image forming apparatus, a plurality of sub-master control units that control a plurality of functions for performing image formation, and a plurality of salve control units that control loads for implementing a plurality of functions. The master control unit is connected to the plurality of sub-master control units via first signal lines. The plurality of sub-master control units are connected to the plurality of slave control units via second signal lines higher in data transfer timing accuracy than the first signal lines.

5 Claims, 14 Drawing Sheets

IMAGE FORMING APPARATUS IMPLEMENTED BY A DISTRIBUTED CONTROL SYSTEM

BACKGROUND OF THE INVENTION

1. Field of the Invention

The present invention relates to an image forming apparatus implemented by a distributed control system including a plurality of CPU groups having a hierarchical structure.

2. Description of the Related Art

Centralized control using one CPU is performed for printer device control of an image forming apparatus using an electrophotographic system. With an increase in CPU load due to control centered on one CPU, a higher performance CPU is required. In addition, with an increase in printer device load, it is necessary to lay in communication cables (a bundle of communication lines) from a CPU board to distant load driver units. This requires many long communication cables. In order to solve this problem, much attention has been paid to a control form of assigning the respective control modules constituting an electrophotographic system to sub-CPUs.

Examples of constructing control systems by distributing the respective partial module control functions using a plurality of CPUs have been proposed in several control equipment product fields other than copying machines. For example, Japanese Patent Laid-Open No. 2000-071819 has proposed a technique of hierarchically locating functional modules in a vehicle and performing distributed control. Japanese Patent Laid-Open No. 2006-171960 has proposed a technique of applying a similar hierarchical control structure to robot/automation equipment. These sub-CPUs require a communication unit to make them operate as a system as a whole. Japanese Patent Laid-Open No. 2006-171960 has proposed a technique of constructing different communication networks for the respective hierarchical layers for a control network for performing communication among functional modules, thereby constructing a stable control network by load distribution.

However, the above prior arts have the following problems. For example, in a vehicle or the like, based on the premise that a plurality of control modules which are physically distant from each other implement large-capacity data communication and ganged control requiring fast responsiveness, the respective modules are connected to each other via a large-sized, high-speed network. Large-capacity data communication in this case is, for example, communication between a car navigation system and an instrument panel control system. In addition, ganged control is, for example, anti-lock brake control implemented by ganging a steering angle (steering wheel) control module with a brake control module.

When such a system arrangement is directly applied to distributed control of an image forming apparatus, since control of each unit of the image forming apparatus requires precise timing control, the respective modules at higher hierarchical layers are connected to each other via a high-speed network. Since a high-speed network communication unit itself is expensive, the cost of the apparatus increases. As described above, when divisional control is to be applied to an image forming apparatus, an increase in cost due to connection via a high-speed network poses a problem.

SUMMARY OF THE INVENTION

The present invention enables realization of an image forming apparatus which implements distributed control using a plurality of control units without causing any increase in cost.

One aspect of the present invention provides an image forming apparatus comprising: an upper layer control unit that controls the image forming apparatus which forms an image on a printing material; and first and second lower layer control units that are controlled by the upper layer control unit and respectively control first and second processing units for performing image formation, wherein the upper layer control unit is connected to the first and second lower layer control units by a first signal line with a predetermined communication speed, and the first lower layer control unit is connected to the first processing unit by a second signal line having a communication speed higher than the first signal line, and the second lower layer control unit is connected to the second processing unit by a third signal line having a communication speed higher than the first signal line.

Another aspect of the present invention provides an image forming apparatus comprising: an upper layer control unit that controls the image forming apparatus which forms an image on a printing material; and first and second lower layer control units that are controlled by the upper layer control unit and respectively control first and second processing units for performing image formation, wherein the first lower layer control unit controls a feed function of feeding a printing material and the second lower layer control unit controls an image formation function of forming an image on a printing material, and the first lower layer control unit performs control to feed a printing material to a registration roller, and the second lower layer control unit performs control to convey the printing material fed to the registration roller and form an image on the printing material.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Arrangement of Image Forming Apparatus

Figure 1:
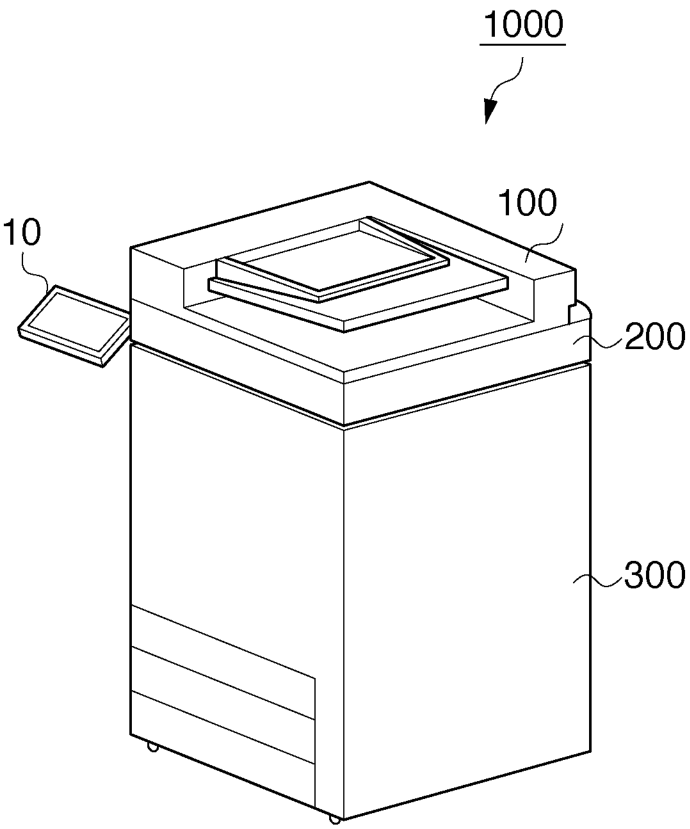
FIG. 1 is a perspective view showing an overview of an image forming apparatus 1000 according to the first embodiment.

The first embodiment will be described below with reference to FIGS. 1 to 13. FIG. 1 shows an overview of an image forming apparatus 1000 according to the first embodiment.

The image forming apparatus 1000 includes an automatic document feeder 100, an image reading unit 200, an image forming unit 300, and an operation unit 10. As shown in FIG. 1, the image reading unit 200 is mounted on the image forming unit 300. The automatic document feeder (DF) 100 is mounted on the image reading unit 200. The image forming apparatus 1000 implements distributed control by using a plurality of control units (CPUs). The arrangement of each CPU will be described later with reference to FIG. 6.

The automatic document feeder 100 automatically conveys a document onto a document glass. The image reading unit 200 outputs image data by reading the document conveyed from the automatic document feeder 100. The image forming unit 300 forms an image on a printing material (printing sheet) based on the image data output from the automatic document feeder 100 or the image data input from an external apparatus connected via a network. The operation unit 10 includes a GUI (Graphical User Interface) with which the user performs various types of operations. The operation unit 10 includes a display unit such as a touch panel and can present information to the user.

<Arrangement of Automatic Document Feeder and Image Reading Unit>

Figure 2:
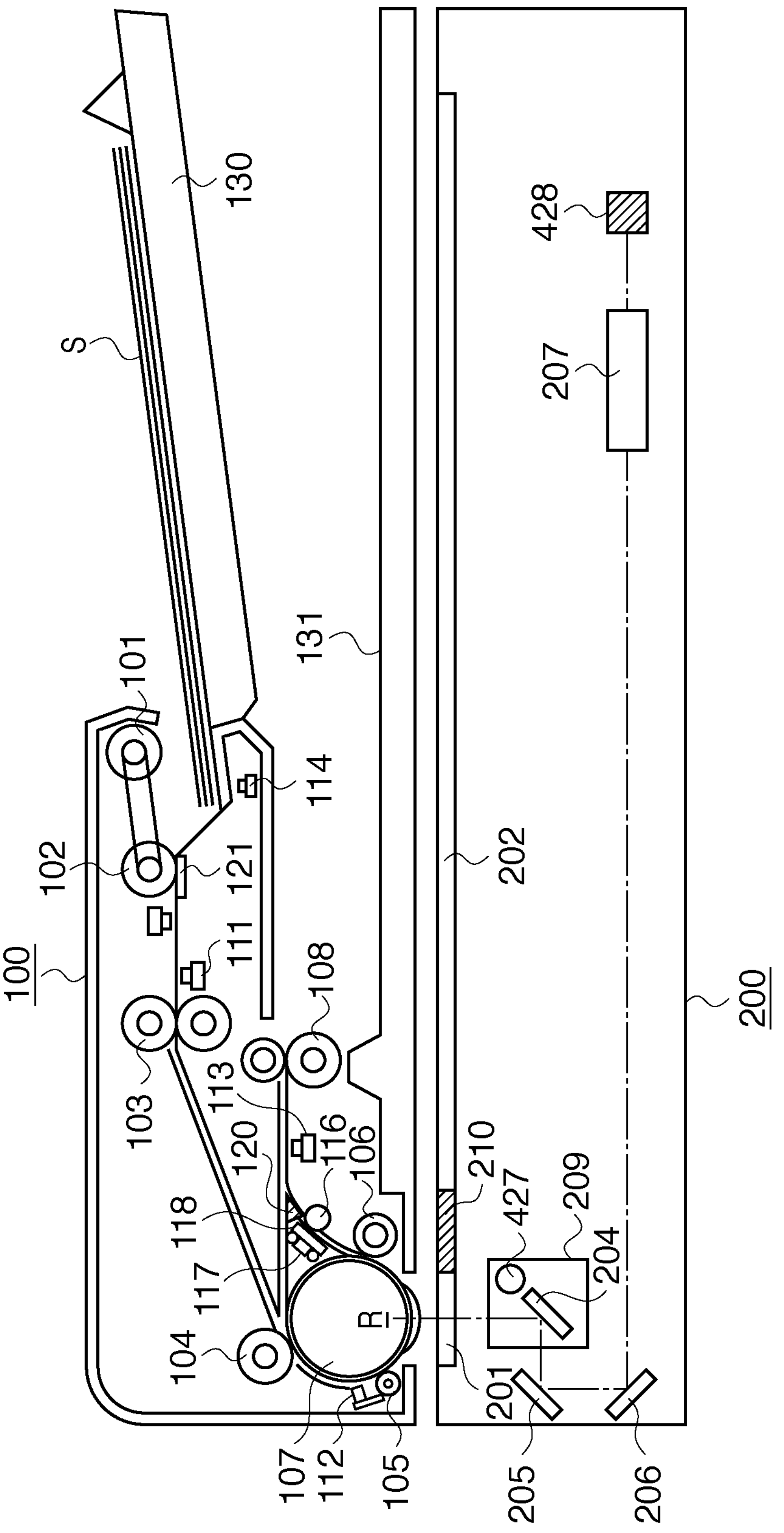
FIG. 2 is a sectional view showing an example of the arrangement of an automatic document feeder 100 and image reading unit 200 according to the first embodiment.

The automatic document feeder 100 and the image reading unit 200 will be described in detail next with reference to FIG. 2. FIG. 2 is a sectional view showing an example of the arrangement of the automatic document feeder 100 and image reading unit 200 according to the first embodiment.

A document set S including at least one sheet is placed on a document tray 130. A DF feed roller 101, a separation roller 102, and a separation pad 121 separate and convey the sheets of the document set S one by one into the automatic document feeder 100. Before a document is conveyed, a document sensor 114 determines whether any document is placed on the document tray 130.

If the document sensor 114 determines that a document is placed, the DF feed roller 101 drops on the document surface of the document set S placed on the document tray 130 and rotates. This operation feeds the uppermost document of the document set. The separation roller 102 and the separation pad 121 act to separate the documents fed by the DF feed roller 101 one by one. A known retard separation technique implements this separation.

Thereafter, a DF convey roller pair 103 conveys the document separated by the separation roller 102 and the separation pad 121 to a DF registration roller 104. The document then comes into contact with the DF registration roller 104. This makes the document bend in the form of a loop and eliminates any skew in conveyance.

A feed path to convey the document passing through the DF registration roller 104 in the direction of a scanning glass 201 of the image reading unit 200 is located downstream of the DF registration roller 104. A read timing sensor 112 is located downstream of the DF registration roller 104. When a predetermined period of time has elapsed after the read timing sensor 112 has detected the document, the image reading unit 200 starts reading the document.

More specifically, a large roller 107 and a DF convey roller 105 convey the document fed to the feed path onto the platen. In this case, the large roller 107 comes into contact with the scanning glass 201. The document fed by the large roller 107 passes through a DF convey roller 106 and moves between a roller 116 and a moving glass 118. The document is then delivered onto a document delivery tray 131 through a DF delivery flapper 120 and DF delivery rollers 108. At this time, a reverse surface image reading unit 117 reads the reverse surface image of the document. A delivery sensor 113 is a sensor for detecting whether a document has been properly delivered onto the delivery tray.

The document tray 130 includes a guide regulating plate which can slide in the sub-scanning direction of a placed document set, and a document width sensor to detect a document width in cooperation with the guide regulating plate. A combination of the document width sensor and a DF pre-registration sensor 111 makes it possible to discriminate the document size of the document set placed on the document tray 130. In addition, a document length sensor provided in the convey path can detect the length of a document from the distance that the document is conveyed from the instant the leading end of the conveyed document is detected to the instant the trailing end of the document is detected. A combination of a detected document length and a document width sensor also makes it possible to discriminate the document size.

The image reading unit 200 optically reads the image information printed on a document and photoelectrically converts the information to output the result as image data. For this purpose, the image reading unit 200 includes the scanning glass 201, a platen glass 202, a scanner unit 209 having a lamp 427 and a mirror 204, mirrors 205 and 206, a lens 207, and a CCD sensor 428. A white board 210 is configured to generate white-level reference data based on shading.

<Control Arrangement>

Figure 3:
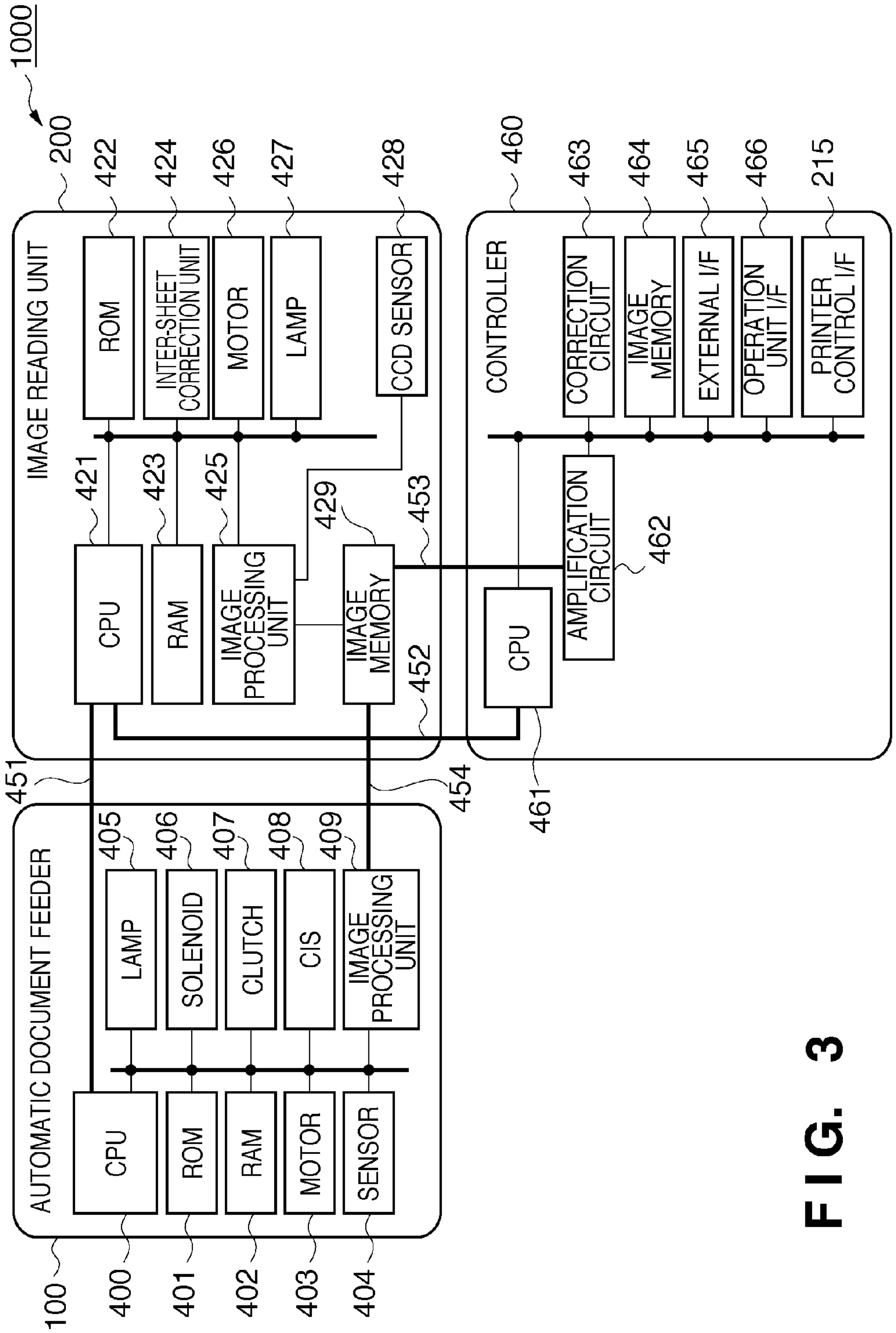
FIG. 3 is a block diagram showing a control arrangement for each unit of the image forming apparatus 1000 according to the first embodiment.

The control arrangement of the image forming apparatus 1000 will be described next with reference to FIG. 3. FIG. 3 is a block diagram showing the control arrangement for each device of the image forming apparatus 1000 according to the first embodiment.

The automatic document feeder 100 includes a CPU 400, a ROM 401, a RAM 402, a motor 403, a sensor 404, a lamp 405, a solenoid 406, a clutch 407, a CIS 408, and an image processing unit 409. The CPU 400 is a central processing unit, which controls each block of the automatic document feeder 100. The ROM 401 is a read only memory, which stores control programs to be read and performed by the CPU 400. The RAM 402 is a random access memory, which includes output and input ports and stores input data and data for operation. The motor 403 to drive various types of convey rollers, the solenoid 406, and the clutch 407 are connected to the output ports. Various types of sensors 404 are connected to the input ports.

The CPU 400 controls sheet conveyance in accordance with a control program stored in the ROM 401 connected to the CPU 400 via a bus. The CPU 400 performs serial communication with a CPU 421 of the image reading unit 200 via a line 451 to exchange control data with the image reading unit 200. The CPU 400 notifies, via the line 451, the image reading unit 200 of an image start signal as a reference for the leading end of document image data.

The reverse surface image reading unit 117 in FIG. 2 includes the lamp 405 and the contact image sensor (CIS) 408, and transfers a read image to the image processing unit 409. The image processing unit 409 processes the read image and outputs the result via a line 454 to make an image memory 429 hold it.

The image reading unit 200 includes the CPU 421, a ROM 422, a RAM 423, an inter-sheet correction unit 424, an image processing unit 425, a motor 426, a lamp 427, a CCD sensor 428, and the image memory 429. The CPU 421 comprehensively controls the respective blocks of the image reading unit 200. The ROM 422, which stores control programs, and the RAM 423, which is a work RAM, are connected to the CPU 421. The motor 426 is a driver circuit for driving an optical driving motor. The CCD sensor 428 is an obverse surface image reading unit, which reads the obverse surface image of a document.

The inter-sheet correction unit 424 performs various inter-sheet corrections to be performed between conveyed documents, e.g., read light amount correction for light amount variations with time and dust detection processing. The image signal imaged on the CCD sensor 428 by the lens 207 is converted into digital image data. The image processing unit 425 then writes the data in the image memory 429 after performing various types of image processing.

The data written in the image memory 429 are sequentially transmitted to a controller 460 via a controller IF 453. The CPU 421 notifies, via a controller IF 452, the controller 460 of an image start signal as a reference for the leading end of document image data at a proper timing. Likewise, the CPU 421 of the image reading unit 200 notifies, via the controller IF 453, the controller 460 of the image start signal notified from the DF via a communication line at a proper timing.

The controller 460 includes a CPU 461, an amplification circuit 462, a correction circuit 463, an image memory 464, an external I/F 465, an operation unit I/F 466, and a printer control I/F 215. The operation unit 10 connected to this apparatus via the operation I/F unit 466 includes a liquid crystal display with a touch panel with which the operator inputs the contents of processing to be performed and which notifies the operator of information associated with processing, warnings, and the like.

The CCD sensor 428 and the CIS 408 output an analog image signal for each read line and sends it to the controller 460 via the image processing units 425 and 409 in the process of scanning a document image. The amplification circuit 462 amplifies these signals and transmits the resultant signals to the correction circuit 463. The correction circuit 463 performs correction processing for an image signal and writes the result in the image memory 464. This apparatus performs the above processing for a document image area to form a read image of the document.

Figure 5:
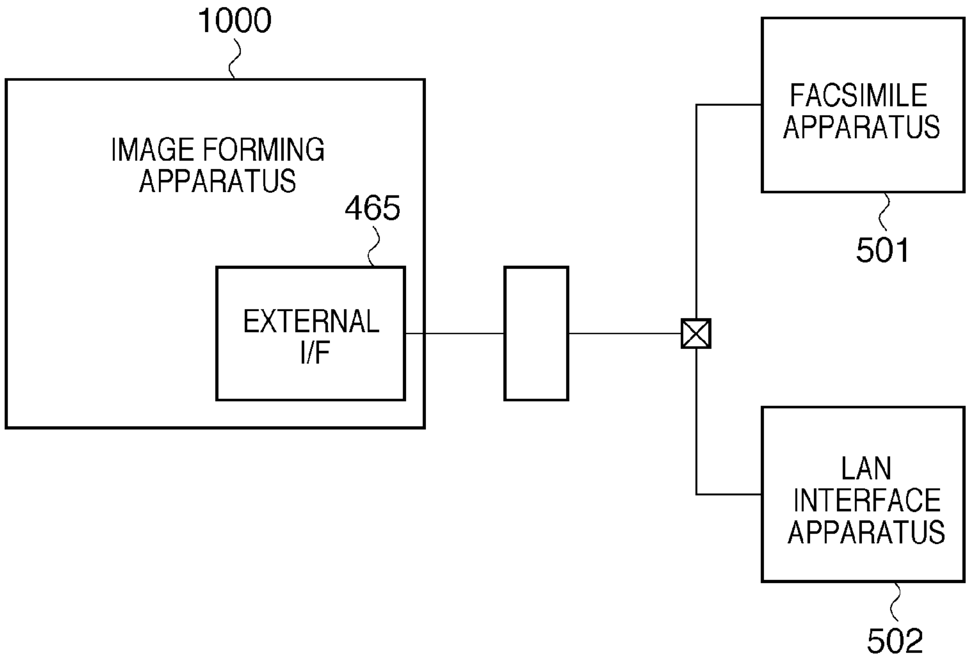
FIG. 5 is a block diagram showing external apparatuses connected to the image forming apparatus 1000 according to the first embodiment.

The external I/F 465 is an interface for exchanging image information, code information, and the like with an apparatus outside the image forming apparatus 1000. More specifically, as shown in FIG. 5, a facsimile apparatus 501 and a LAN interface apparatus 502 can be connected to the external I/F 465. FIG. 5 is a block diagram showing the external apparatuses connected to the image forming apparatus 1000 according to the first embodiment. Note that mutual communication among the facsimile apparatus 501, the LAN interface apparatus 502, and the CPU 461 implements procedure control for the exchange of image information and code information with the facsimile apparatus 501 and the LAN interface apparatus 502.

As described above, this embodiment uses the CIS 408 as the reverse surface image reading unit of the automatic document feeder 100, and the CCD sensor 428 as the obverse surface image reading unit of the image reading unit 200. However, it is possible to use any sensor which can read images.

<Image Forming Unit>

Figure 4:
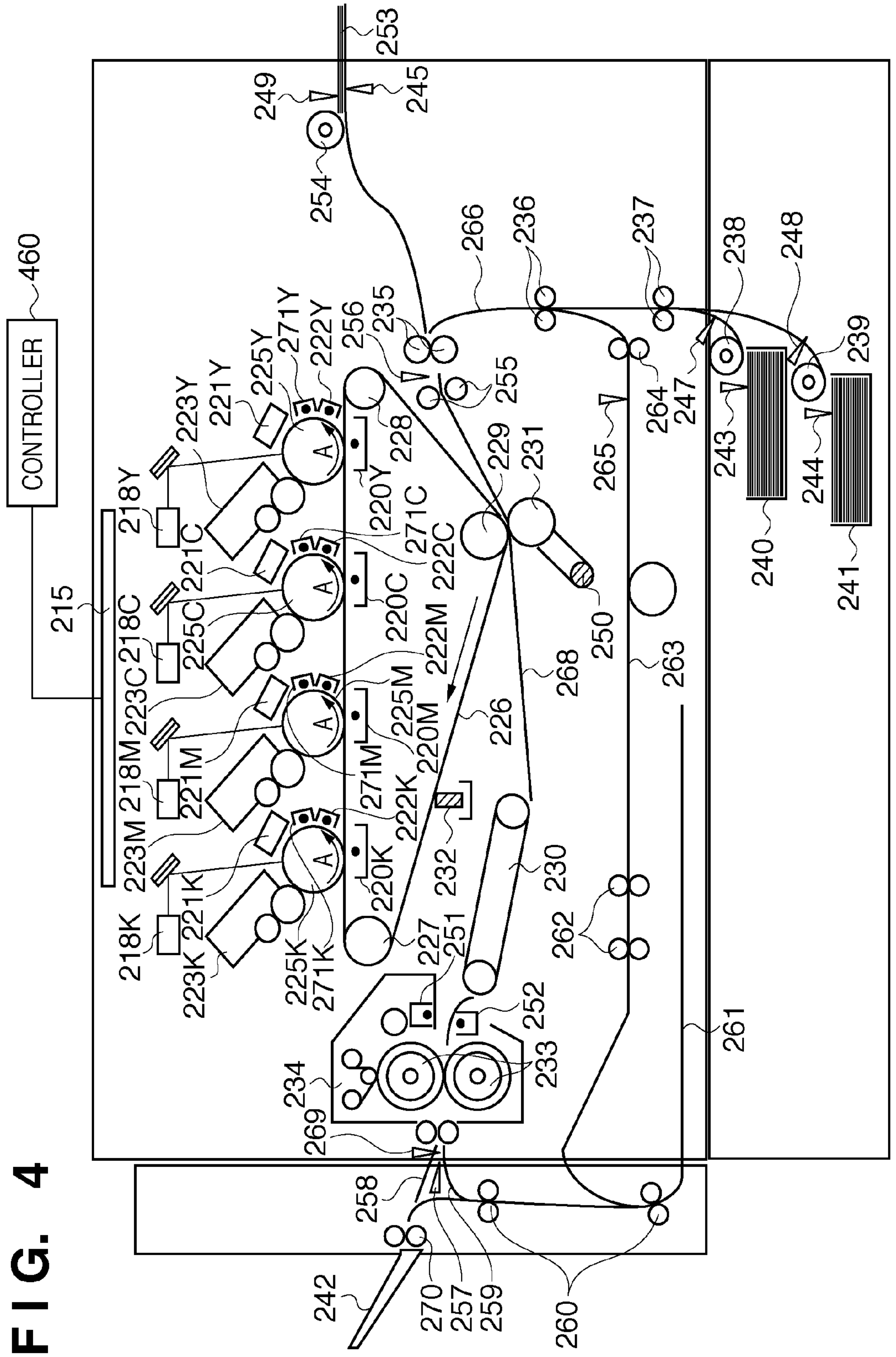
FIG. 4 is a sectional view showing an example of the arrangement of an image forming unit 300 according to the first embodiment.

The image forming unit 300 will be described in detail next with reference to FIG. 4. FIG. 4 is a sectional view showing an example of the arrangement of the image forming unit 300 according to the first embodiment. Note that the image forming unit 300 according to this embodiment uses an electrophotographic system. Note that the letters Y, M, C, and K as the suffices of reference numerals in FIG. 4 indicate the respective engines corresponding to yellow, magenta, cyan, and black toners. In the following description, an engine corresponding to all types of toner will be denoted by a reference numeral without any of the letters Y, M, C, and K as suffixes, and an engine corresponding to each type of toner will be denoted by a reference numeral having a corresponding one of the letters Y, M, C, and K as a suffix.

A photosensitive drum (to be simply referred to as a "photosensitive member" hereinafter) 225 serving as an image carrier for forming a full-color electrostatic image is provided to be rotated by a motor in the direction indicated by arrow A. A primary charger 221, an exposure device 218, a developing device 223, a transfer device 220, a cleaner device 222, and a charge remover 271 are arranged around the photosensitive member 225.

A developing device 223K is a developing device for monochromatic developing, and develops a latent image on a photosensitive member 225K with a toner of K. Developing devices 223Y, 223M, and 223C are developing devices for full-color developing, and respectively develop latent images on photosensitive members 225Y, 225M, and 225C with toners of Y, M, and C. The transfer device 220 multilayer-transfers the toner image of each color developed on the photosensitive member 225 onto a transfer belt 226 as an intermediate transfer member altogether. As a result, the toner images of the four colors are superimposed.

The transfer belt 226 is spanned around rollers 227, 228, and 229. The roller 227 functions as a driving roller which is coupled to a driving source to drive the transfer belt 226. The roller 228 functions as a tension roller to adjust the tension of the transfer belt 226. The roller 229 functions as a backup roller of a transfer roller as a secondary transfer device 231. A transfer roller drive unit 250 is a driving unit for making the secondary transfer device 231 come into contact with or withdraw from the transfer belt 226. A cleaner blade 232 is provided below the transfer belt 226 after the position where the belt passes through the secondary transfer device 231. The blade scrapes off the residual toner on the transfer belt 226.

A registration roller 255, a feed roller pair 235, and vertical path roller pairs 236 and 237 feed printing materials (printing sheets) stored in cassettes 240 and 241 and a manual paper feed unit 253 to the nip portion, i.e., the contact portion between the secondary transfer device 231 and the transfer belt 226. Note that at this time, the transfer roller drive unit 250 makes the secondary transfer device 231 be in contact with the transfer belt 226. The toner image formed on the transfer belt 226 is transferred onto a printing material at this nip portion. Thereafter, the fixing device 234 thermally fixes the toner image transferred on the printing material. The printing material is then delivered outside the apparatus.

The cassettes 240 and 241 and the manual paper feed unit 253 respectively include sheet absence sensors 243, 244, and 245 each for detecting the presence/absence of a printing material. In addition, the cassettes 240 and 241 and the manual paper feed unit 253 respectively include feed sensors 247, 248, and 249 each for detecting a failure to pick up a printing material.

Image forming operation by the image forming unit 300 will be described below. When image formation starts, pickup rollers 238, 239, and 254 convey printing materials stored in the cassettes 240 and 241 and the manual paper feed unit 253 one by one to the feed roller pair 235. When the feed roller pair 235 conveys the printing material to the registration roller 255, a registration sensor 256 located immediately before the registration roller 255 detects the passage of the printing material.

When the registration sensor 256 detects the passage of a printing material, the apparatus according to this embodiment temporarily interrupts convey operation after the lapse of a predetermined period of time. As a result, the printing material comes into contact with the registration roller 255 at rest, and convey operation stops. At this time, a convey position is so fixed as to make the end portion of the printing material in the traveling direction perpendicular to the convey path, thereby correcting any skew of the printing material, i.e., the state in which the conveying direction of the printing material is shifted from the convey path. This processing will be referred to as position correction hereinafter. Position correction is required to minimize any subsequent ramp of the image forming direction relative to the printing material. After position correction, the registration roller 255 is started to supply the printing material to the secondary transfer device 231. Note that the registration roller 255 is coupled to a driving source to be rotated/driven by transmission of drive through a clutch.

The surface of the photosensitive member 225 is then negatively charged uniformly to a predetermined charge potential by applying a voltage to the primary charger 221. Subsequently, the exposure device 218 including a laser scanner unit performs exposure so as to set an image portion on the charged photosensitive member 225 at a predetermined exposure potential, thereby forming a latent image. The exposure device 218 turns on and off laser light based on the image data sent from the controller 460 via the printer control I/F 215, thereby forming a latent image corresponding to the image data.

In addition, a developing bias set in advance for each color is applied to the developing roller of the developing device 223, and the above latent image is developed with toner and visualized as a toner image when passing through the position of the developing roller. The transfer device 220 transfers the toner image onto the transfer belt 226. The secondary transfer device 231 then transfers the image onto the printing material conveyed by the feed unit. Thereafter, the printing material passes through a post-registration convey path 268, and is conveyed to a fixing device 234 through a fixing convey belt 230.

In the fixing device 234, first of all, pre-fixing chargers 251 and 252 charge the printing material to prevent image disturbance by compensating for the attraction power of toner, and fixing rollers 233 thermally fix the toner image. Thereafter, a delivery flapper 257 switches the convey path to a delivery path 258 to make delivery rollers 270 deliver the printing material onto a delivery tray 242.

The cleaner device 222 removes and recovers the residual toner on the photosensitive member 225. Lastly, the charge remover 271 uniformly removes the charges on the photosensitive member 225 to near 0 volts to prepare for the next image formation cycle.

The color image formation start timing of the image forming apparatus 1000 allows to form an image at an arbitrary position on the transfer belt 226 because of simultaneous transfer of toner images of Y, M, C, and K. However, it is necessary to determine an image formation start timing while considering the shifts in the transfer positions of toner images on the photosensitive members 225Y, 225M, and 225C.

Note that in the image forming unit 300, it is possible to continuously feed printing materials from the cassettes 240 and 241 and the manual paper feed unit 253. In this case, in consideration of the sheet length of a preceding printing material, sheets are fed from the cassettes 240 and 241 and the manual paper feed unit 253 at the shortest intervals at which no printing materials overlap each other. As described above, after position correction, the printing material is supplied to the secondary transfer device 231 by starting the registration roller 255. When the printing material reaches the secondary transfer device 231, the registration roller 255 is temporarily stopped again. The purpose of this is to correct the position of a succeeding printing material in the same manner as the preceding printing material.

The operation to form an image on the reverse surface of a printing material will be described in detail next. When forming an image on the reverse surface of a printing material, this apparatus forms an image on the obverse surface of the printing material first. When an image is to be formed on only the obverse surface, the fixing device 234 thermally fixes a toner image on the printing material first, and then directly delivers the printing material onto the delivery tray 242. Assume that the apparatus is to successively form an image on the reverse surface. In this case, when a sensor 269 detects the printing material, the delivery flapper 257 switches the convey path to a reverse surface path 259. Accordingly, reverse rollers 260 rotate to convey the printing material to an obverse/reverse surface inversion path 261. After the printing material is conveyed on the obverse/reverse surface inversion path 261 by a distance corresponding to the width in the feed direction, the reverse rollers 260 rotate in the reverse direction to switch the traveling direction of the printing material. Obverse/reverse surface path convey rollers 262 are driven to convey the printing material to an obverse/reverse surface path 263 with the obverse surface, on which the image is formed, facing down.

When the printing material is conveyed to re-feed rollers 264 along the obverse/reverse surface path 263, a re-feed sensor 265 located immediately before the re-feed rollers 264 detects the passage of the printing material. When the re-feed sensor 265 detects the passage of the printing material, the apparatus according to this embodiment temporarily interrupts the convey operation after the lapse of a predetermined period of time. As a result, the printing material comes into contact with the re-feed rollers 264 at rest, and the convey operation temporarily stops. At this time, the position of the printing material is so fixed as to make the end portion of the printing material in the traveling direction perpendicular to the convey path, thereby correcting any skew of the printing material, i.e., the state in which the conveying direction of the printing material is shifted from the convey path in the re-feed path. This processing will be referred to as position recorrection hereinafter.

Position recorrection is required to minimize any subsequent ramp of the image forming direction relative to the reverse surface of the printing material. After position recorrection, the re-feed rollers 264 are started to convey the printing material onto a feed path 266 with the obverse and reverse surfaces being inverted. Subsequent image forming operation is the same as the above image forming operation for the obverse surface, and hence a description of the operation will be omitted. The printing material with images being formed on its obverse and reverse surfaces is delivered onto the delivery tray 242 by switching the convey path to the delivery path 258 using the delivery flapper 257.

Note that the image forming unit 300 can continuously feed printing materials in the two-sided printing mode as well. However, since this apparatus includes only one system for operation including forming an image on a printing material and fixing formed toner images, it is not possible to simultaneously print images on the obverse and reverse surfaces. In the two-sided printing mode, therefore, the image forming unit 300 alternately forms images on printing materials fed from the cassettes 240 and 241 and the manual paper feed unit 253 and printing materials which are inverted for reverse-surface printing and re-fed to the image forming unit.

In the image forming unit 300, the respective loads shown in FIG. 4 are grouped into four control blocks to be described later, namely a convey module A 280, a convey module B 281, an image forming module 282, and a fixing module 283, and each block is autonomously controlled. The image forming unit 300 also includes a master module 284 for comprehensively controlling the four control blocks to make them function as an image forming apparatus. A control arrangement for each module will be described below with reference to FIG. 6.

Figure 6:
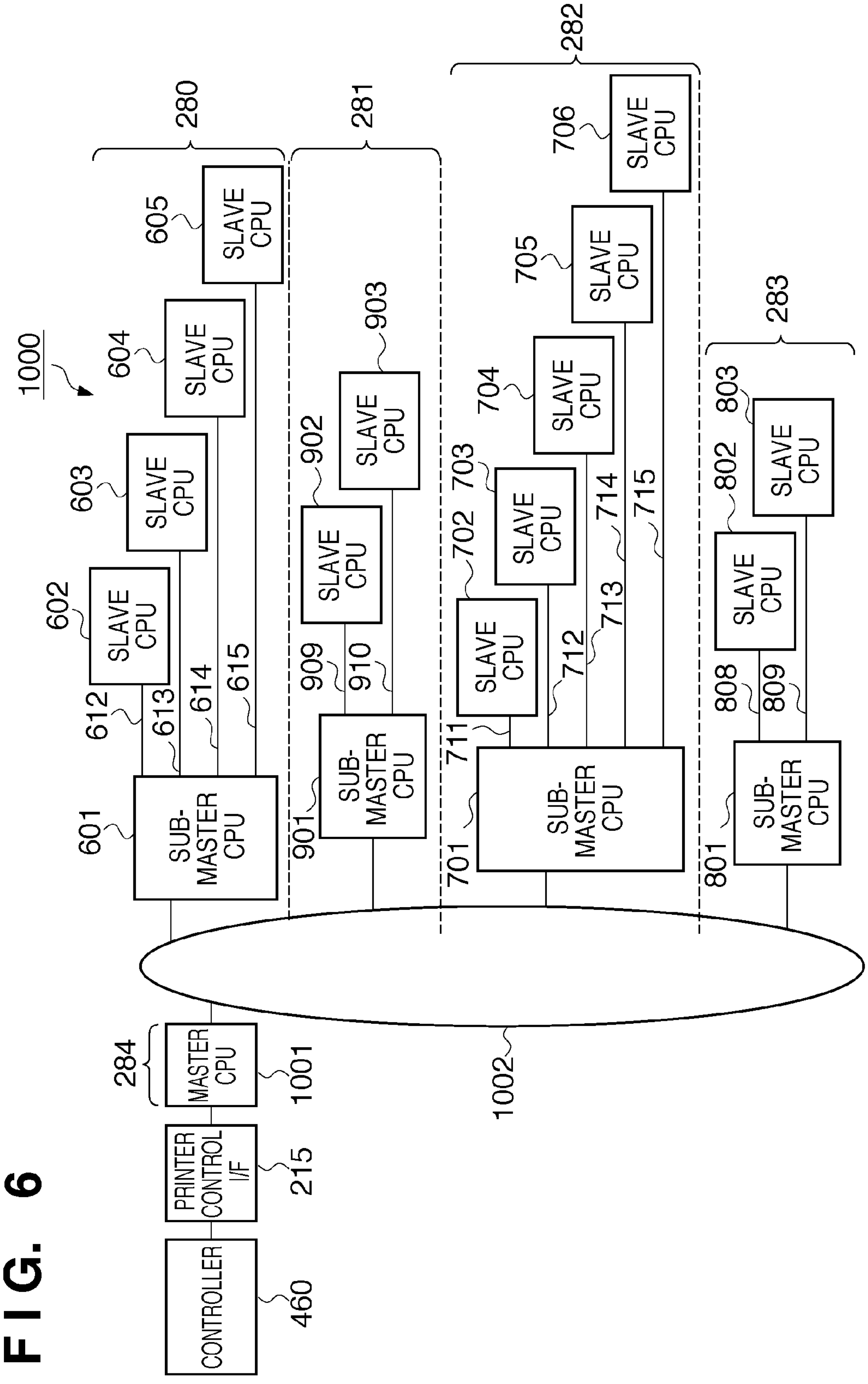
FIG. 6 is a block diagram schematically showing the connection between a master CPU, sub-master CPUs, and slave CPUs according to the first embodiment.

FIG. 6 is a block diagram schematically showing the connection between a master CPU, sub-master CPUs, and slave CPUs according to the first embodiment. In this embodiment, a master CPU (master control unit/upper layer control unit) 1001 provided in the master module 284 controls the overall image forming apparatus 1000 based on instructions and image data sent from the controller 460 via the printer control I/F 215. The convey module A 280, convey module B 281, image forming module 282, and fixing module 283 for performing image formation respectively include sub-master CPUs (sub-master control units/lower layer control units) 601, 901, 701, and 801 for controlling the respective functions. The master CPU 1001 controls the sub-master CPUs 601, 901, 701, and 801. The respective functional modules include slave CPUs (slave control units/processing units) 602, 603, 604, 605, 902, 903, 702, 703, 704, 705, 706, 802, and 803 for making the loads for performing the respective functions operate. The sub-master CPU 601 controls the slave CPUs 602, 603, 604, and 605. The sub-master CPU 901 controls the slave CPUs 902 and 903. The sub-master CPU 701 controls the slave CPUs 702, 703, 704, 705, and 706. The sub-master CPU 801 controls the slave CPUs 802 and 803.

As shown in FIG. 6, the master CPU 1001 and the plurality of sub-master CPUs 601, 701, 801, and 901 are connected to each other via a common network type communication bus (first signal line) 1002. The sub-master CPUs 601, 701, 801, and 901 are also connected to each other via a network type communication bus (first signal line) 1002. Note that the master CPU 1001 and the plurality of sub-master CPUs 601, 701, 801, and 901 may be ring-connected to each other. The sub-master CPU 601 is further connected one-to-one to the plurality of slave CPUs 602, 603, 604, and 605 (peer-to-peer connection) via high-speed serial communication buses (second signal lines) 612, 613, 614, and 615. Likewise, the sub-master CPU 701 is connected to each of the slave CPUs 702, 703, 704, 705, and 706 via a corresponding one of high-speed serial communication buses (second signal lines) 711, 712, 713, 714, and 715. The sub-master CPU 801 is connected to each of the slave CPUs 802 and 803 via a corresponding one of high-speed serial communication buses (second signal lines) 808 and 809. The sub-master CPU 901 is connected to each of the slave CPUs 902 and 903 via a corresponding one of high-speed serial communication buses (second signal lines) 909 and 910. In this case, each high-speed serial communication bus is used for short-distance, high-speed communication.

In the image forming apparatus 1000 according to this embodiment, functional division is performed to implement control requiring timing-dependent responsiveness within the functional modules comprehensively controlled by the respective sub-master CPUs. For this reason, high-speed serial communication buses with high responsiveness are used for communication between the respective slave CPUs for driving the end loads and the respective sub-master CPUs. That is, as the second signal lines, signal lines with higher timing accuracy for data transfer than the first signal lines are used.

On the other hand, the sub-master CPUs 601, 701, 801, and 901 and the master CPU 1001 mutually perform only the operation of comprehensively controlling a rough processing procedure for image forming operation without requiring any precise control timings. For example, the master CPU 1001 issues instructions to start a pre-image formation process, a pre-feed process, and a post-image formation process to the sub-master CPUs. The master CPU 1001 also issues, to the sub-master CPUs, instructions based on the modes designated by the controller 460 (e.g., the monochrome mode and the two-sided image formation mode) before the start of image formation. The sub-master CPUs 601, 701, 801, and 901 mutually perform only operation requiring no precise timing control. That is, the control of the image forming apparatus is divided into control units which do not mutually require precise timing control, and the respective sub-master CPUs control the respective control units at precise timings. This makes it possible for the image forming apparatus 1000 to minimize the communication traffic and perform connection with the inexpensive, low-speed network type communication bus 1002. Note that it is always necessary to mount the master CPU, sub-master CPUs, and slave CPUs on uniform control boards. It is possible to variably locate them on control boards in accordance with situations concerning apparatus implementation.

Figure 7:
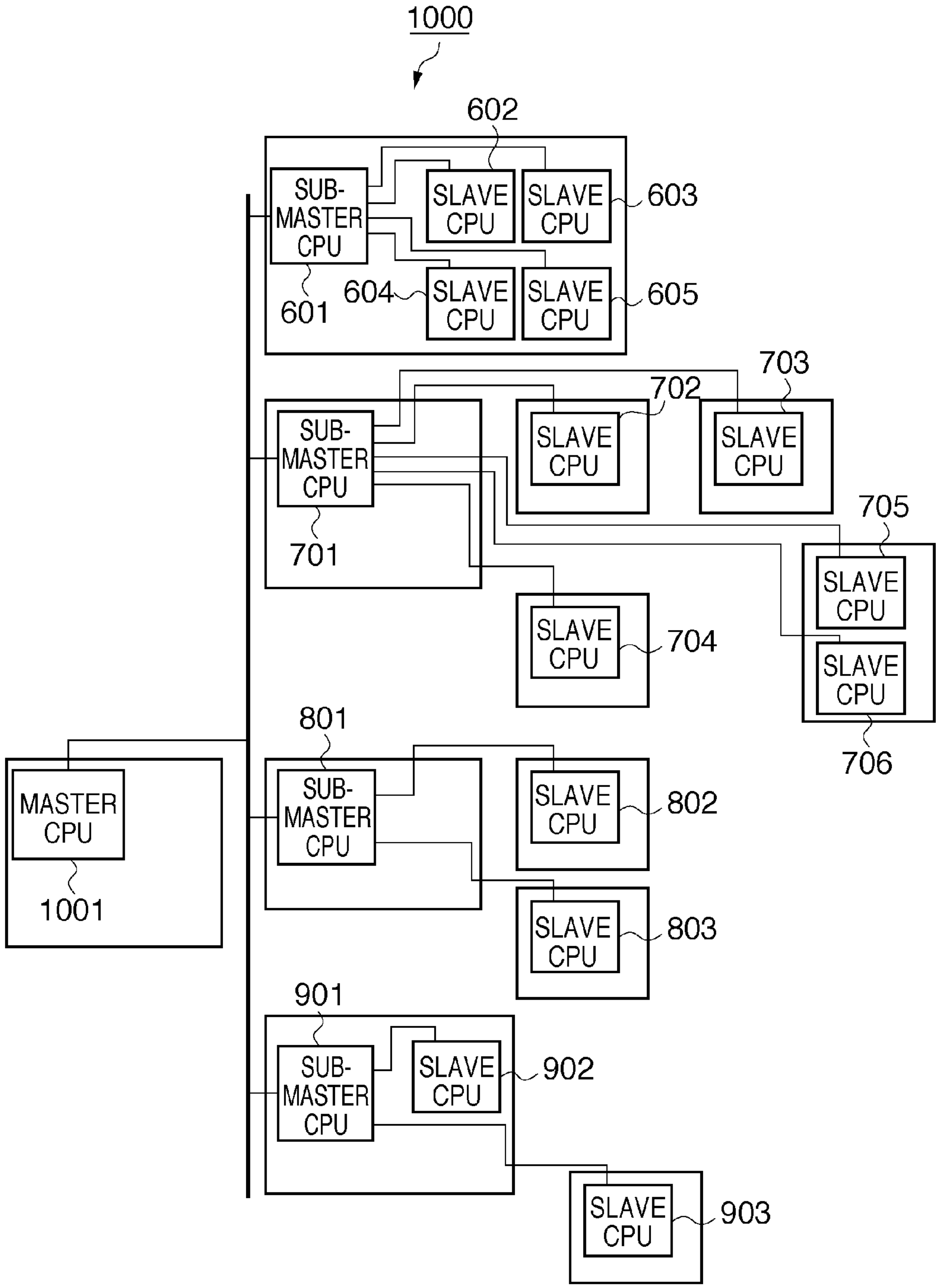
FIG. 7 is a view showing an example of the control boards of the image forming apparatus 1000 according to the first embodiment.

The specific locations of the master CPU, sub-master CPUs, and slave CPUs in this embodiment will be described with reference to FIG. 7 in terms of board arrangement. FIG. 7 is a view showing an example of the control boards of the image forming apparatus 1000 according to the first embodiment.

This embodiment can use various control board arrangements, as shown in FIG. 7. For example, the sub-master CPU 601 and the slave CPUs 602, 603, 604, and 605 are mounted on the same board. In addition, it is possible to mount a sub-master CPU and slave CPUs on independent boards, respectively, like the sub-master CPU 701 and the slave CPUs 702, 703, and 704 or the sub-master CPU 801 and the slave CPUs 802 and 803. Furthermore, it is possible to mount some slave CPUs on the same board, like the slave CPUs 705 and 706. Moreover, it is possible to mount only some of the sub-master CPUs and the slave CPUs on the same board, like the sub-master CPU 901 and the slave CPU 902.

<Arrangement of Each Control Module>

Figure 8:
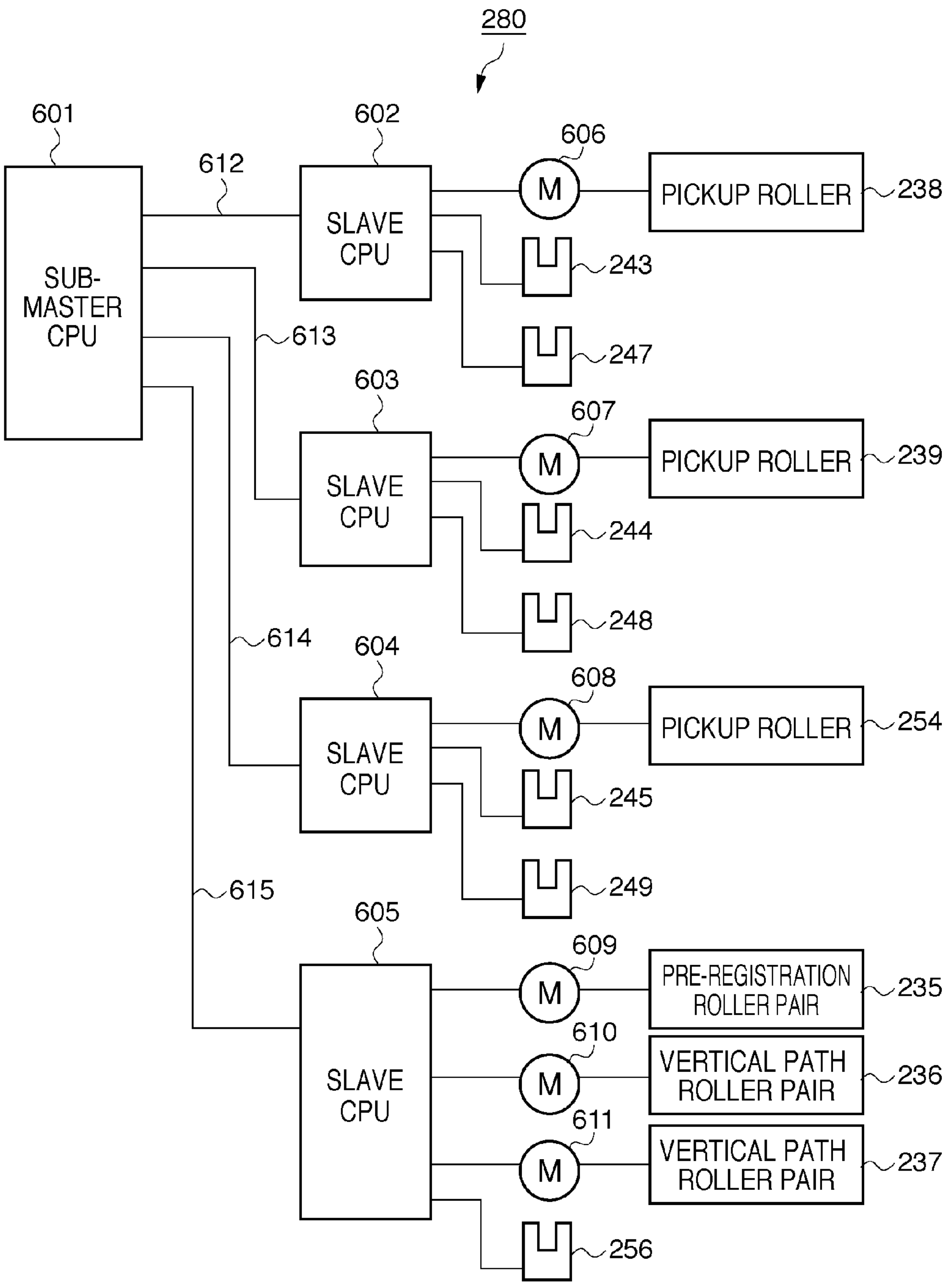
FIG. 8 is a view showing an example of the arrangement of a convey module A 280 according to the first embodiment.

The function and arrangement of each control module will be described in detail with reference to FIGS. 8 to 11. FIG. 8 is a view showing an example of the arrangement of the convey module A 280 according to the first embodiment.

The convey module A 280 takes charge of feed control (feed function) until each of printing materials stored in the cassettes 240 and 241 and the manual paper feed unit 253 comes into contact with the nip portion of the registration roller 255 at rest. The convey module A 280 includes the sub-master CPU 601 to comprehensively control feed control and the slave CPUs 602, 603, 604, and 605 to drive the respective loads. In addition, load groups to be directly controlled are connected to the respective slave CPUs.

The slave CPU 602 has, as loads, a driving source motor 606 for driving the pickup roller 238 associated with the cassette 240, the sheet absence sensor 243, and the feed sensor 247, and performs control until a printing material is transferred to the feed path 266. The slave CPU 603 has, as loads, a driving source motor 607 for driving the pickup roller 239 associated with the cassette 241, the sheet absence sensor 244, and the feed sensor 248, and performs control until a printing material is transferred to the feed path 266. The slave CPU 604 has, as loads, a driving source motor 608 for driving the pickup roller 254 associated with the manual paper feed unit 253, the sheet absence sensor 245, and the feed sensor 249, and performs control until a printing material is transferred to the feed path 266. The slave CPU 605 has, as loads, driving source motors 609, 610, and 611 for driving the feed roller pairs 235, 236, and 237 and the registration sensor 256. The slave CPU 605 controls these loads to perform control until each of printing materials transferred from the cassettes 240 and 241 and the manual paper feed unit 253 is conveyed to come into contact with the nip portion of the registration roller 255, and is temporarily stopped. In this embodiment, the sub-master CPU 601 is connected one-to-one to the slave CPUs 602, 603, 604, and 605 via the independent high-speed serial communication buses 612, 613, 614, and 615.

Figure 9:
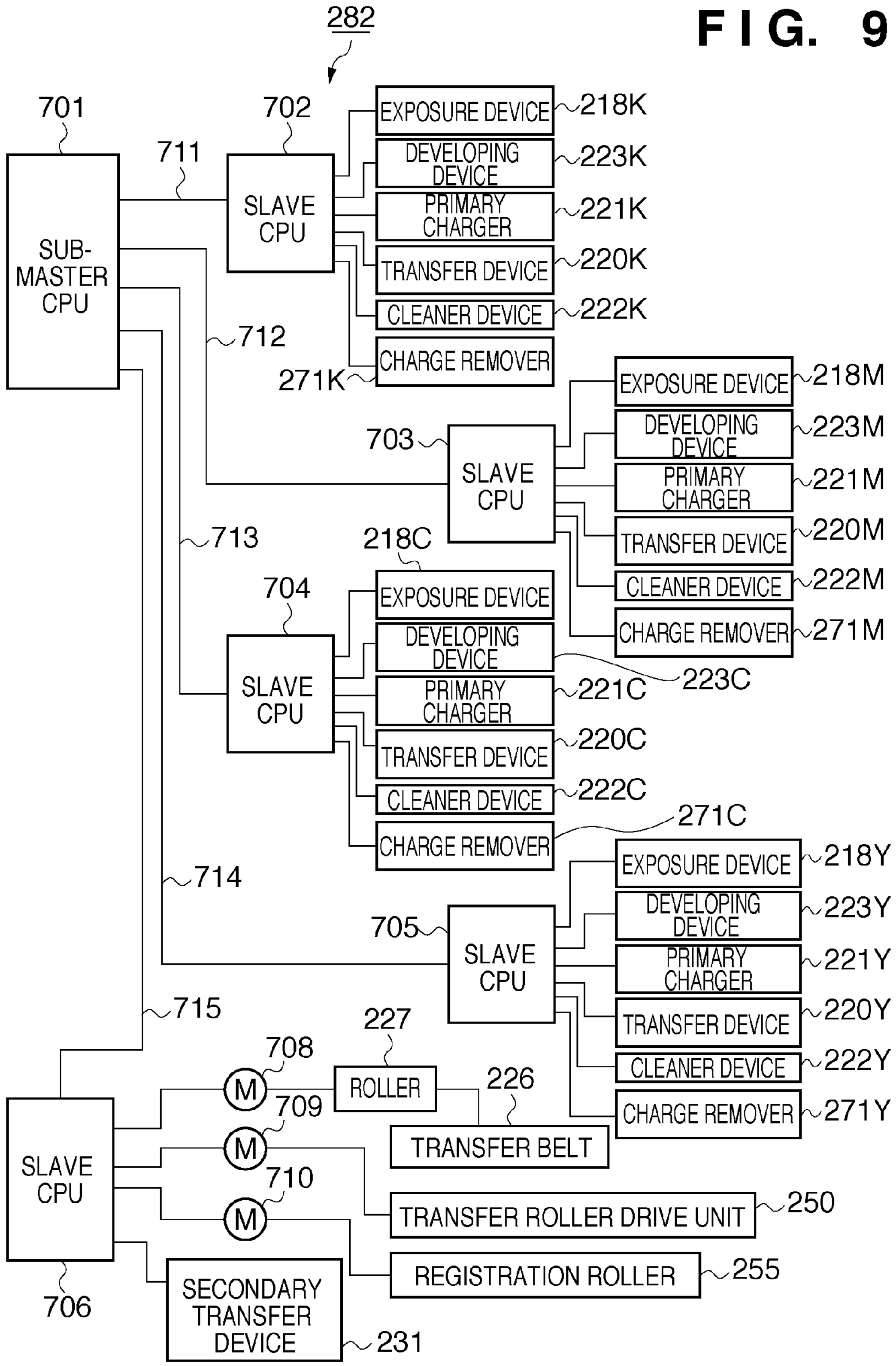
FIG. 9 is a view showing an example of the arrangement of an image forming module 282 according to the first embodiment.

FIG. 9 is a view showing an example of the arrangement of the image forming module 282 according to the first embodiment. The image forming module 282 takes charge of image formation control (image formation function) until the full-color toner image formed by an electrophotographic process is transferred onto the transfer belt 226 and is re-transferred onto the printing material transferred by the convey module A 280. The image forming module 282 includes the sub-master CPU 701 to comprehensively perform image formation control and the slave CPUs 702, 703, 704, 705, and 706 to drive the respective loads. Load groups to be directly controlled are connected to the respective slave CPUs.

The slave CPU 702 has, as loads, an exposure device 218K, the developing device 223K, a primary charger 221K, a transfer device 220K, a cleaner device 222K, and a charge remover 271K, and performs control until a black toner image is transferred onto the transfer belt 226. The slave CPU 703 has, as loads, an exposure device 218M, the developing device 223M, a primary charger 221M, a transfer device 220M, a cleaner device 222M, and a charge remover 271M, and performs control until a magenta toner image is transferred onto the transfer belt 226. The slave CPU 704 has, as loads, an exposure device 218C, the developing device 223C, a primary charger 221C, a transfer device 220C, a cleaner device 222C, and a charge remover 271C, and performs control until a cyan toner image is transferred onto the transfer belt 226. The slave CPU 705 has, as loads, an exposure device 218Y, the developing device 223Y, a primary charger 221Y, a transfer device 220Y, a cleaner device 222Y, and a charge remover 271Y, and performs control until a yellow toner image is transferred onto the transfer belt 226.

The slave CPU 706 has, as loads, a motor 708 for the roller 227 to rotate/drive the transfer belt 226, a high-voltage signal output device to drive the secondary transfer device 231, and driving source motors 709 and 710 to drive the transfer roller drive unit 250 and the registration roller, respectively. The slave CPU 706 controls these loads to perform control until the toner images of the four colors multilayer-transferred on the transfer belt 226 are re-transferred onto a printing material by using the secondary transfer device 231. Note that in this embodiment, the sub-master CPU 701 is connected one-to-one to the slave CPUs 702, 703, 704, 705, and 706 via the independent high-speed serial communication buses 711, 712, 713, 714, and 715.

Figure 10:
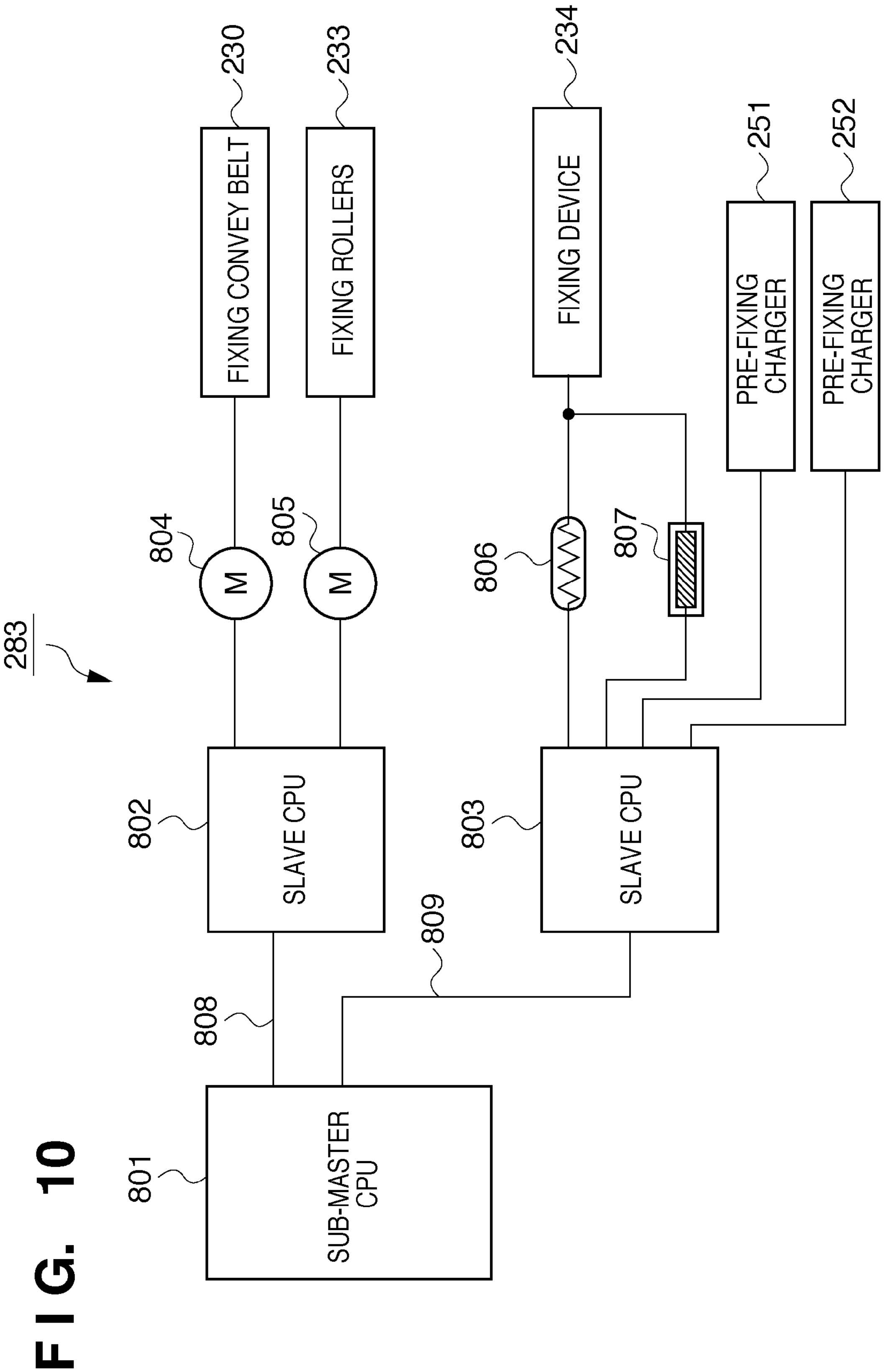
FIG. 10 is a view showing an example of the arrangement of a fixing module 283 according to the first embodiment.

FIG. 10 is a view showing an example of the arrangement of the fixing module 283 according to the first embodiment. The fixing module 283 takes charge of fixing control (fixing function) until a printing material on which a toner image is transferred by the image forming module 282 is fed to the fixing device 234, and the toner image is thermally fixed on the printing material. The fixing module 283 includes the sub-master CPU 801 to comprehensively perform fixing control and the slave CPUs 802 and 803 to drive the respective loads. Load groups to be directly controlled are connected to the respective slave CPUs.

The slave CPU 802 has, as loads, a driving source motor 804 for rotating the fixing convey belt 230 and a driving source motor 805 for rotating the fixing rollers 233, and performs control until a printing material is transferred from the secondary transfer device 231 onto the convey path after fixing. The slave CPU 803 has, as loads, a heater 806 in the fixing device 234, a temperature detection thermistor 807, and the pre-fixing chargers 251 and 252. The slave CPU 803 controls these loads to perform fixing temperature control of the fixing device 234 by optimally generating heat from the heater while charging the fixing rollers 233 by using the pre-fixing chargers 251 and 252 and feeding back the detection result obtained by the temperature detection thermistor 807. Note that in this embodiment, the sub-master CPU 801 is connected one-to-one to the slave CPUs 802 and 803 via the independent high-speed serial communication buses 808 and 809.

Figure 11:
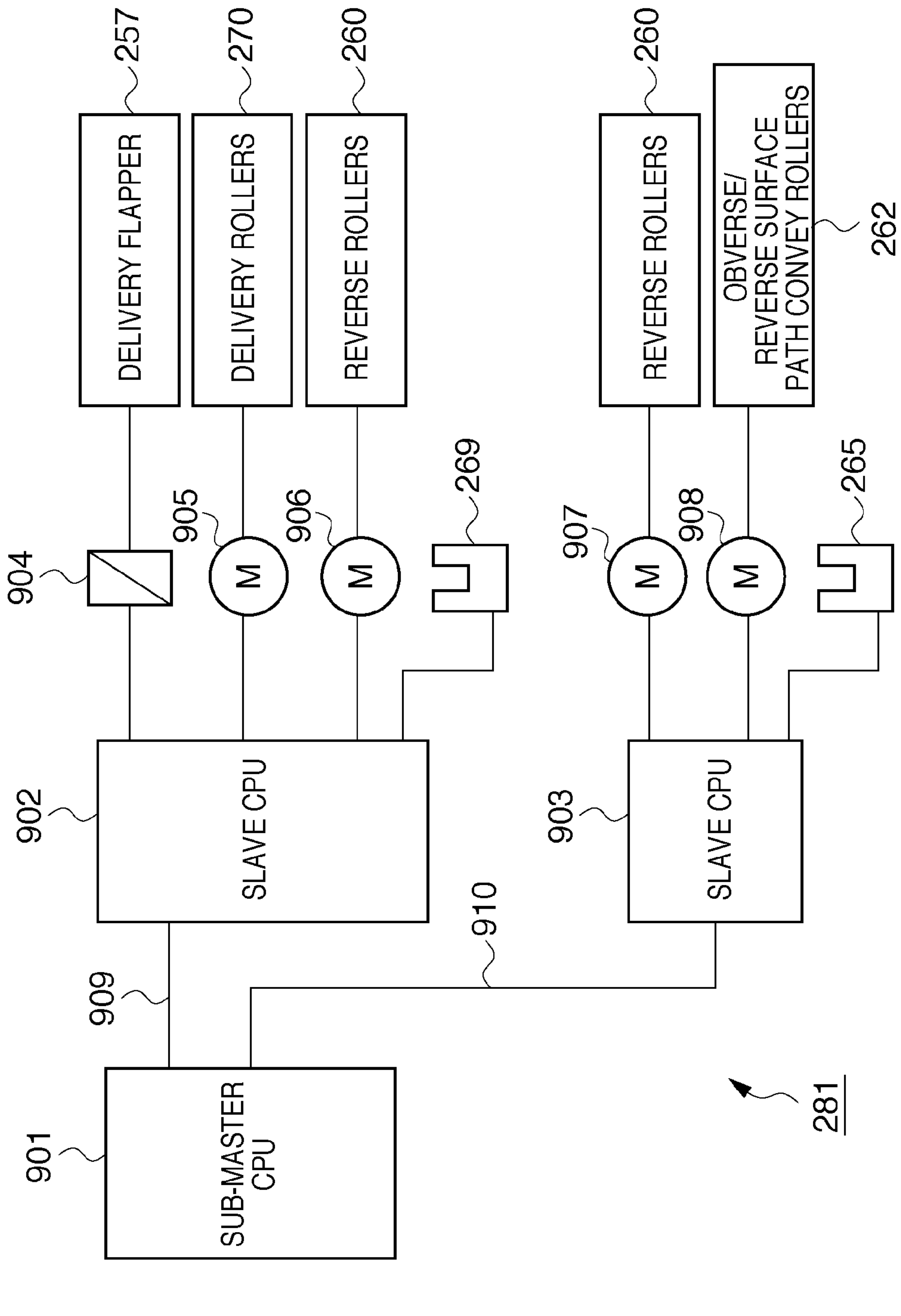
FIG. 11 is a view showing an example of the arrangement of a convey module B 281 according to the first embodiment.

FIG. 11 is a view showing an example of the arrangement of the convey module B 281 according to the first embodiment. The convey module B 281 takes charge of delivery control (delivery function) until a printing material on which an image is fixed by the fixing module 283 is received, and is delivered outside the image forming unit 300 or reverse surface inversion control (inversion function) until the obverse and reverse surfaces of a printing material are reversed for reverse surface printing and is transferred to the convey module A 280. The convey module B 281 includes the sub-master CPU 901 to comprehensively perform delivery control and reverse surface inversion control and the slave CPUs 902 and 903 to drive the respective loads. Load groups to be directly controlled are connected to the respective slave CPUs.

The slave CPU 902 has, as loads, a solenoid 904 for switching the delivery flapper 257, a driving source motor 905 for driving the delivery rollers 270, a driving source motor 906 for driving the reverse rollers 260, and the sensor 269. The slave CPU 902 controls these loads to perform control until a printing material is delivered from the convey path to outside the apparatus after fixing or transferred to the obverse/reverse surface inversion path 261. The slave CPU 903 has, as loads, a driving source motor 907 for driving the obverse/reverse surface path convey rollers 262, a driving source motor 908 for driving the re-feed rollers 264, and the re-feed sensor 265. The slave CPU 903 controls these loads to perform control until a printing material transferred from the inversion path is transferred to the feed path 266 again. Note that in this embodiment, the sub-master CPU 901 is connected one-to-one to the slave CPUs 902 and 903 via the independent high-speed serial communication buses 909 and 910.

This embodiment implements image formation control for a printing material by combining the autonomous operations of the above four sub-modules. Practical image forming operation is divided into several patterns in accordance with a combination of selection of a feed tray/paper size, designation of one-sided/two-sided printing, designation of monochrome printing/color printing, and the like. When the operator makes settings in advance via the operation unit 10 and the external I/F 465, specific instructions are input. In order to implement operation desired by the operator based on the instructions, it is necessary to perform overall control to make the respective modules systematically operate. In this embodiment, the master CPU 1001 in the master module 284 comprehensively controls the sub-master CPUs 601, 701, 801, and 901. In this case, a rough procedure for overall control by the master CPU 1001 is implemented by the exchange of commands by communication between the master CPU 1001 and the sub-master CPUs 601, 701, 801, and 901 via the low-speed network type communication bus 1002. In addition, this procedure is implemented by the exchange of commands by one-to-one communication between the sub-master CPUs 601, 701, 801, and 901 and the slave CPUs 602, 603, 604, 605, 702, 703, 704, 705, 706, 802, 803, 902, and 903 via high-speed serial communication buses.

<Control Procedure>

Figure 12:
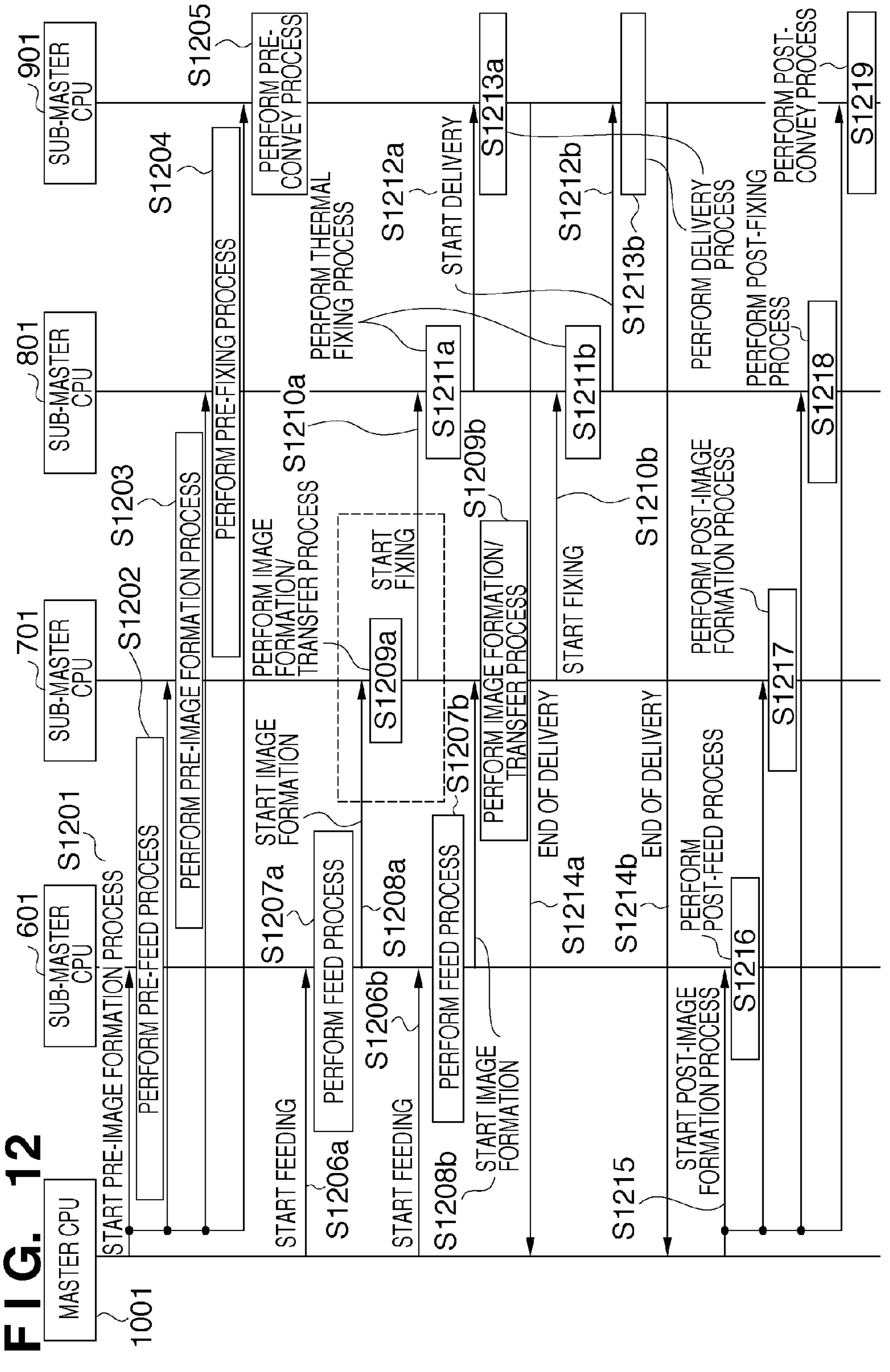
FIG. 12 is a sequence chart showing a control procedure in the image forming apparatus 1000 according to the first embodiment.

A control procedure in the image forming apparatus 1000 according to this embodiment will be described next with reference to FIG. 12. FIG. 12 is a sequence chart showing a control procedure in the image forming apparatus 1000 according to the first embodiment. Note that the sequence chart shown in FIG. 12 is based on the assumption that image formation is performed for one printing material.

First of all, in step S1201, the master CPU 1001 issues instructions to start pre-image formation processes to the sub-master CPUs 601, 701, 801, and 901 before the start of image formation. Subsequently, in steps S1202, S1203, S1204, and S1205, the sub-master CPUs 601, 701, 801, and 901 perform pre-processes for image formation. More specifically, the sub-master CPU 601 performs a pre-feed process. The sub-master CPU 701 performs a pre-image formation process. The sub-master CPU 801 performs a pre-fixing process. The sub-master CPU 901 performs a pre-convey process.

In step S1206*a*, the master CPU 1001 instructs the sub-master CPU 601 to start feeding the first printing material in accordance with an instruction from the operator via the operation unit 10 or the external I/F 465.

Upon receiving an instruction to start feeding a printing material, the sub-master CPU 601 starts a sheet feed process in step S1207*a*. In the sheet feed process, a printing material placed on one of the cassettes 240 and 241 and the manual paper feed unit 253 is conveyed to the position of the registration roller 255 and temporarily stopped. Thereafter, in step S1208*a*, the sub-master CPU 601 issues an instruction to start image formation to the sub-master CPU 701 after the lapse of a predetermined period of time.

Upon receiving an instruction to start image formation, the sub-master CPU 701 starts conveying a printing material by rotating the registration roller 255 at rest and performs an image formation process for the photosensitive member 225 and a transfer process for the transfer belt 226 and the printing material in step S1209*a*. Controlling a convey process and an image formation/transfer process for a printing material from the registration roller 255 using one sub-master CPU makes it possible to perform positioning between the printing material and the image, which requires precise timing control. In addition, even if different sub-master CPUs control a feed process for a printing material to the registration roller 255 and a convey process for the printing material from the registration roller 255, a communication delay between the sub-master CPUs is absorbed by the stop period of a printing material at the registration roller 255. Subsequently, in step S1210*a*, upon confirming that a predetermined period of time has elapsed and the printing material on which an image is formed is conveyed toward the fixing device 234, the sub-master CPU 701 instructs the sub-master CPU 801 to start fixing.

Upon receiving the instruction to start fixing, the sub-master CPU 801 performs a thermal fixing process for the printing material in step S1211*a*. Since no precise timing is required for the start of driving the fixing module 283, even if different sub-master CPUs control an image formation/transfer process and a thermal fixing process, any communication delay between the sub-master CPUs poses no problem. Subsequently, in step S1212*a*, upon confirming that a predetermined period of time has elapsed and the printing material on which the image is fixed is conveyed toward the delivery rollers 270, the sub-master CPU 801 instructs the sub-master CPU 901 to start paper delivery.

Upon receiving the instruction to start paper delivery, the sub-master CPU 901 performs a delivery process for the printing material in step S1213*a*. Since no precise timing is required for the start of driving the convey module B 281, even if different sub-master CPUs control a thermal fixing process and a delivery process, any communication delay between the sub-master CPUs poses no problem. Thereafter, in step S1214*a*, when the delivery process is complete, the sub-master CPU 901 notifies the master CPU 1001 of the corresponding information.

Upon receiving the notification of the completion of the delivery process, the master CPU 1001 instructs the sub-master CPUs 601, 701, 801, and 901 to start post-image formation processes in step S1215. Thereafter, in steps S1216, S1217, S1218, and S1219, the sub-master CPUs 601, 701, 801, and 901 perform post-processes for completing image formation. More specifically, the sub-master CPU 601 performs a post-feed process. The sub-master CPU 701 performs a post-image formation process. The sub-master CPU 801 performs a post-fixing process. The sub-master CPU 901 performs a post-convey process.

The above sequence has exemplified the series of image formation processing from feeding to delivery of one printing material. Assume that this apparatus continuously performs image formation for a plurality of printing materials. In this case, for example, as indicated by steps S1206*b* to S1214*b* in FIG. 12, when a predetermined period of time has elapsed after the start of image formation on the first printing material, the apparatus can continuously perform image formation. In this case, the apparatus repeatedly performs the processing in steps S1206*b* to S1214*b* in accordance with the number of printing materials.

In this case, the intervals at which instructions to start feeding are issued are expected to be shorter than the intervals at which actual printing materials are fed. However, since a precise feed timing of printing materials is defined in the convey module A comprehensively controlled by the sub-master CPU 601, it is not necessary for the master CPU 1001 to strictly guarantee a timing.

Likewise, in order to achieve a predetermined image formation intervals (i.e., productivity), the intervals at which instructions to start image formation for printing materials to be continuously fed are issued are expected to be shorter than the intervals at which image formation is actually performed for printing materials. However, since a precise image formation timing for each printing material is defined in the execution of image formation control in the image forming module comprehensively controlled by the sub-master CPU 701, it is not necessary for the sub-master CPU 601 to strictly guarantee a timing. The exchange of commands at the time of execution of image formation control will be described later in detail.

The exchange of trigger commands for processing, other than the start of paper feeding and image formation described above, between the master CPU 1001 and the sub-master CPUs 601, 701, 801, and 901 is defined to only roughly notify the start of processing. That is, since a precise processing procedure for control is not defined, the frequency of issuing commands per unit time is not very high, and it is not necessary to strictly guarantee each command transmission timing.

Therefore, as the network type communication bus 1002 which connects the master CPU 1001 to the sub-master CPUs 601, 701, 801, and 901, an inexpensive communication bus with a relatively low communication speed corresponding to a communication period of about 10 msec can be used. Such communication buses include, for example, a LIN communication bus (Local Interconnect Network communication bus) and an I2C communication bus (Inter-Integrated Circuit communication bus).

It is also possible, in consideration of reliability, to use a network communication bus such as a CAN communication bus (Control Area Network communication bus). In this case as well, however, since the amount of communication data per unit time can be relatively small, the communication rate can be set low. This can further improve the reliability of communication. In this embodiment, in particular, the control CPU boards on which the master CPU 1001 and the sub-master CPUs 601, 701, 801, and 901 are mounted are physically spaced away from each other, and hence the communication network cable for the respective CPUs becomes very long. As the communication network cable length and the network communication rate increase, the apparatus becomes susceptible to the influence of external noise. For this reason, considering robustness against external noise as well, it is useful to set the network communication rate low.

Figure 13:
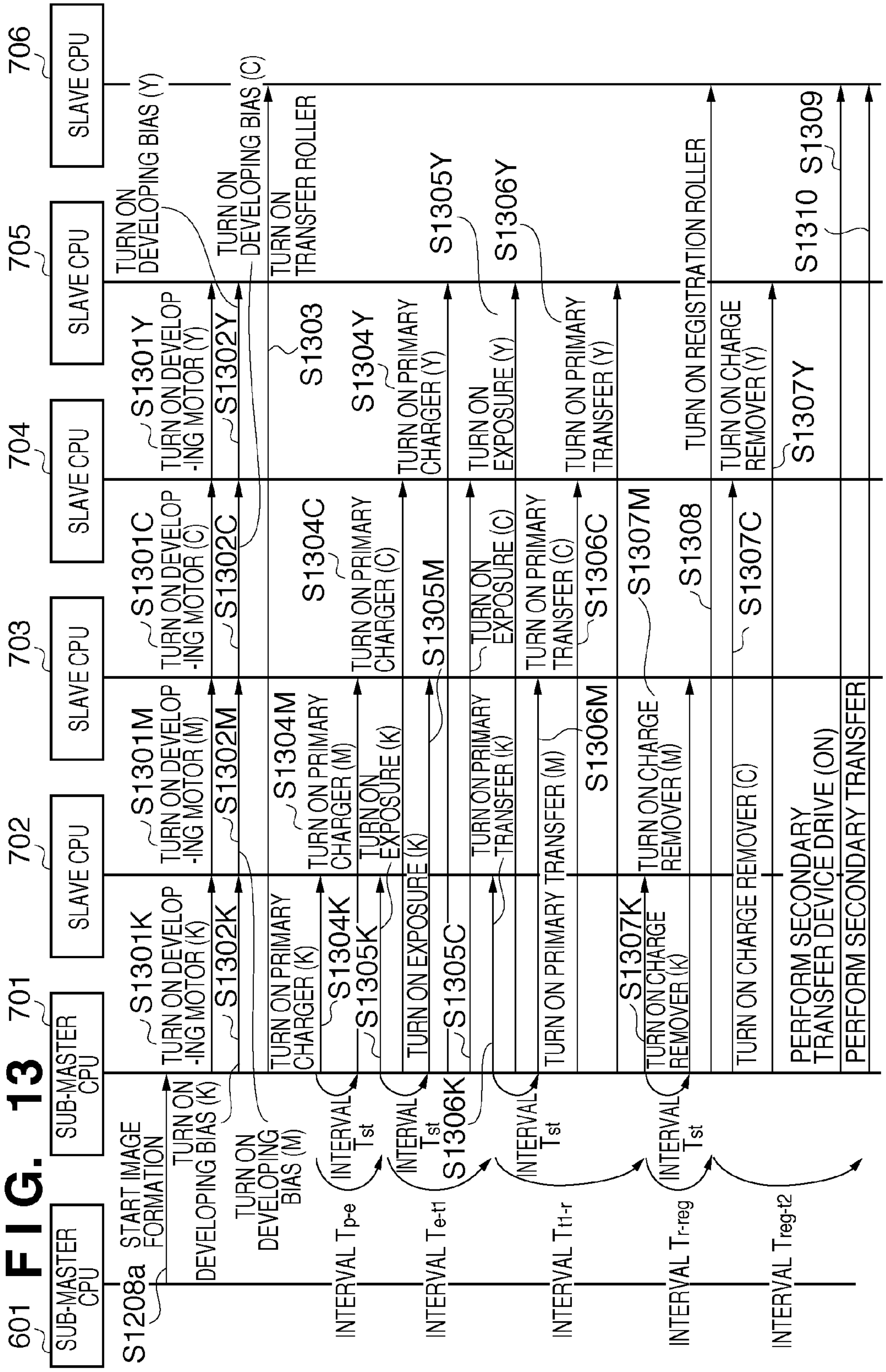
FIG. 13 is a sequence chart showing the processing (corresponding to one sheet) to be performed by the image forming module 282 according to the first embodiment upon reception of an instruction to start image formation.

The processing performed by a sub-master CPU and slave CPUs in this embodiment will be described next with reference to FIG. 13. FIG. 13 is a sequence chart showing the processing (corresponding to one sheet) to be performed when the image forming module 282 according to the first embodiment receives an instruction to start image formation. As an example of the processing performed by a sub-master CPU and slave CPUs, the processing performed by the sub-master CPU 701 and slave CPUs 702, 703, 704, and 705 of the image forming module 282 will be described.

First of all, in steps S1301K, S1301M, S1301C, and S1301Y, upon receiving an instruction to start image formation from the sub-master CPU 601, the sub-master CPU 701 issues instructions to rotate/drive the developing rollers to the slave CPUs 702, 703, 704, and 705. In steps S1302K, S1302M, S1302C, and S1302Y, the sub-master CPU 701 issues instructions to set developing biases to predetermined high voltage values at the time of image formation. Because developing bias settings do not depend on the timings among the stations of K, M, C, and Y, the sub-master CPU simultaneously turns on all the four stations at the same time when receiving a command. At the same time, the sub-master CPU issues a trigger command 1303 to start driving the transfer roller to the slave CPU 706.

Subsequently, in steps 1304K, 1304M, 1304C, and 1304Y, steps 1305K, 1305M, 1305C, and 1305Y, steps 1306K, 1306M, 1306C, and 1306Y, and steps 1307K, 1307M, 1307C, and 1307Y, the sub-master CPU 701 notifies the respective stations of instructions to perform a series of processing required for image formation. More specifically, the sub-master CPU 701 issues, to the respective slave CPUs, trigger commands to start primary charging, exposure, primary transfer, and charge removal. In this case, in order to perform accurate image formation, it is necessary to accurately generate these trigger commands at a predetermined period. In this embodiment, as shown in FIG. 13, the period from the start of primary charging to the start of exposure is set to $T_{p-e}$, the period from the start of exposure to the start of primary transfer is set to $T_{p-t1}$, and the period from the start of primary transfer to the start of charge removal is set to $T_{t1-r}$. Each period T is set in advance in consideration of image quality and productivity.

In addition, the timings at which commands are issued to the slave CPUs 702, 703, 704, and 705 need to be shifted from each other by a delay period $T_{st}$ in consideration of positional shifts in terms of the locations of the photosensitive members 225K, 225M, 225C, and 225Y. A failure to implement this timing shift with high accuracy will cause printed image pattern offsets (so-called color misregistrations) among the respective stations.

The sub-master CPU 701 then secondarily transfers the toner images formed on the transfer belt onto a printing material. For this purpose, in step S1308, the sub-master CPU 701 issues, to the slave CPU 706, a registration ON command to rotate/drive the driving source motor 710 for driving the registration roller 255 at the timing at which the printing material has reached the position of the secondary transfer device 231 at the start of secondary transfer. In steps S1309 and S1310, the sub-master CPU 701 issues, to the slave CPU 706, a secondary transfer device drive (ON) command to bring the secondary transfer device 231 into contact with the transfer belt 226 and a secondary transfer start command.

In this case, in order to properly transfer the image on the transfer belt 226 to a desired position on the printing material, it is necessary to accurately issue a secondary transfer start command and a registration ON command at a predetermined period. In this embodiment, as shown in FIG. 13, the period from the start of discharging to the start of the driving source motor 710 is set to $T_{r-reg}$, and the period from the start of the driving source motor 710 to the start of secondary transfer is set to $T_{reg-t2}$.

As described above, it is necessary to frequently exchange issued commands with considerably high accuracy within a given unit time in the processing procedure between each sub-master CPU and each slave CPU as compared with the processing procedure between the master CPU 1001 and each sub-master CPU. In addition, in order to continuously form images on a plurality of printing materials, it is necessary to repeatedly perform these series of processes at a given predetermined period. A delay or variation in the processing period at this time will affect the productivity of the image forming apparatus. That is, the processing procedure between each sub-master CPU and each slave CPU can be an important factor in guaranteeing the performance of the apparatus.

This embodiment therefore uses the high-speed serial communication buses 711 to 715 to independently ensure the performance represented by a communication period of about 10 μsec for communication between the sub-master CPU 701 and the slave CPUs 702 to 706. That is, when the master CPU 1001 is connected to the sub-master CPUs 601, 701, 801, and 901 at a predetermined communication speed, the sub-master CPU 701 is connected to the slave CPUs 702 to 706 at a higher communication speed. In addition, the high-speed serial communication buses 711 to 715 are wired to connect the sub-master CPU 701 one-to-one to the slave CPUs 702 to 706. This makes it possible to reduce the communication delay losses between the sub-master CPU 701 and the slave CPUs 702, 703, 704, 705, and 706 to as close as zero as possible, suppress timing variations in the exchange of commands, and improve the accuracy of timing control. This image forming apparatus can therefore improve the image quality at the time of image formation and the productivity at the time of continuous printing.

When such high-speed serial communication is applied between the master CPU 1001 and the sub-master CPUs 601, 701, 801, and 901, increases in cost and communication rate can lead to vulnerability to noise and the like. However, the sub-master CPU 701 and the slave CPUs 702, 703, 704, 705, and 706 are likely to be mounted at relatively close positions in the location arrangement. Therefore, since a long communication bus is not required between the sub-master CPU and the slave CPUs, the distance that a highly conductive, expensive bus cable required for high-speed communication is laid in can be minimized. In addition, since it is possible to locally narrow down the range of occurrence of high frequency noise which needs to be considered when the communication rate is increased, it is possible to take countermeasures against noise at a low cost, thereby suppressing an increase in cost.

In addition, since the function of the sub-master CPU 701 is limited to control of only a portion associated with a given functional module, the number of slave CPUs 702, 703, 704, 705, and 706 which are subordinate to the sub-master CPU is limited. That is, the arrangement of one-to-one connection using high-speed serial communication has sufficient feasibility.

Although the arrangement of the sub-master CPU 701 and slave CPUs 702, 703, 704, 705, and 706, in particular, has been described with reference to FIG. 13, a similar arrangement can be applied to communication between the remaining sub-master CPUs 601, 801, and 901 and the slave CPUs.

Second Embodiment

Figure 14:
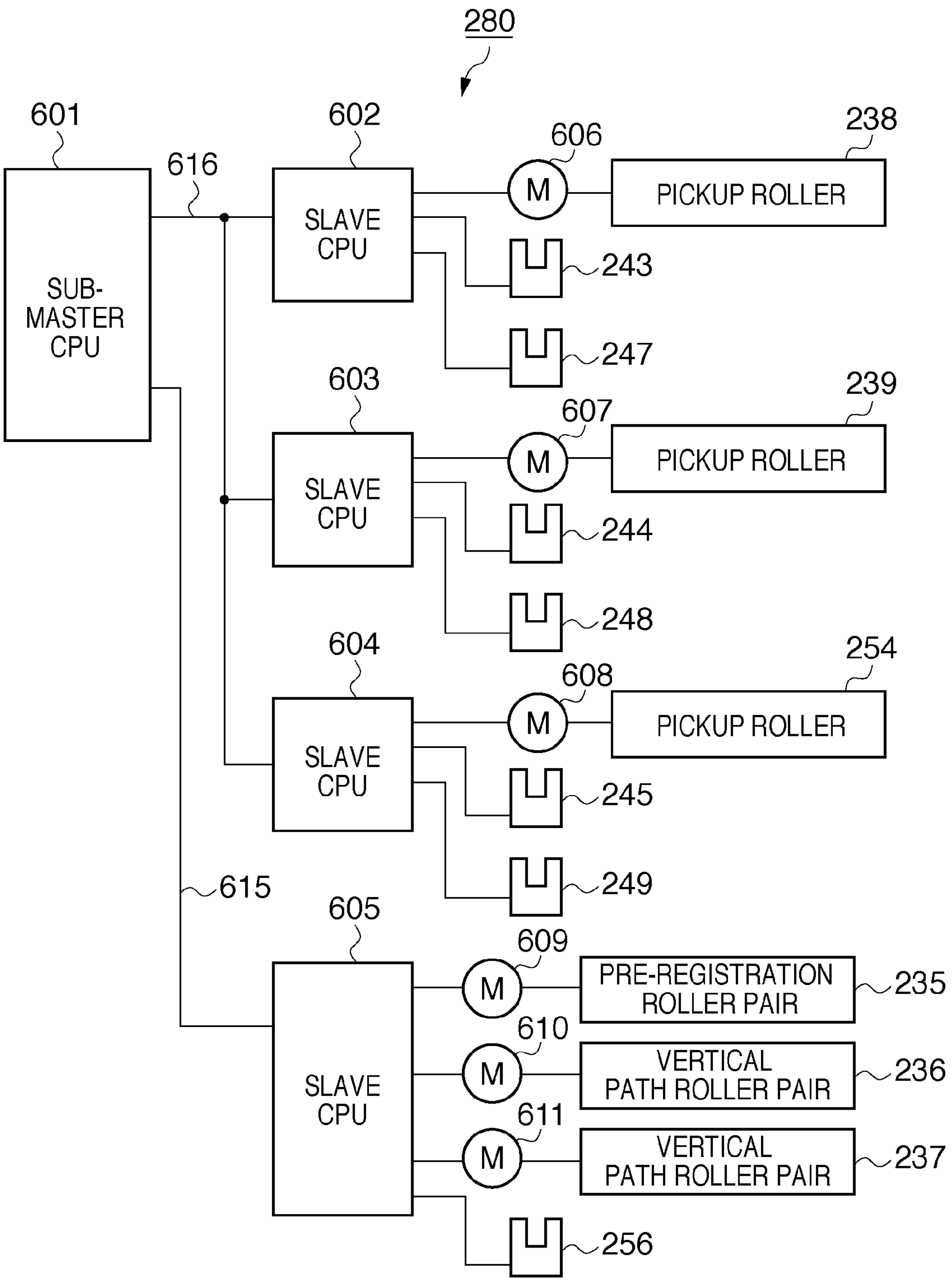
FIG. 14 is a view showing an example of the arrangement of a convey module A 280 according to the second embodiment.

The second embodiment will be described next with reference to FIG. 14. FIG. 14 shows an example of the arrangement of a convey module A 280 according to the second embodiment. The same reference numerals as in the first embodiment described with reference to FIG. 8 denote the same constituent elements in the second embodiment, and a description will not be repeated.

In the first embodiment, the feed path 266 is not configured to simultaneously receive a plurality of printing materials. That is, printing materials stored in one of the cassettes 240 and 241 and the manual paper feed unit 253 are sequentially transferred one by one to the feed path 266. In this embodiment, therefore, there is no need to connect high-speed serial buses one-to-one to the slave CPUs 602, 603, and 604 associated with the cassettes 240 and 241 and the manual paper feed unit 253 which are feed units. It is possible to cascade the slave CPUs 602, 603, and 604 to the sub-master CPU 601 via one serial bus 616. For example, as shown in FIG. 14, it is possible to perform one-to-many connection (bus connection) between the sub-master CPU 601 and the slave CPUs 602, 603, and 604. Using such an arrangement can further reduce the number of communication bus lines between the sub-master CPU 601 and the slave CPUs 602, 603, and 604, and can further reduce the bundle of lines. Note that the sub-master CPU 601 is connected to the slave CPU 605 via the serial bus 615 independent of the serial bus 616. This is because, since the slave CPU 605 needs to receive a printing material fed from one of the cassettes 240 and 241 and the manual paper feed unit 253 at a predetermined timing, it is necessary to perform timing control more accurately than between the sub-master CPU 601 and the slave CPUs 602, 603, and 604.

Other Embodiments

Aspects of the present invention can also be realized by a computer of a system or apparatus (or devices such as a CPU or MPU) that reads out and performs a program recorded on a memory device to perform the functions of the above-described embodiment(s), and by a method, the steps of which are performed by a computer of a system or apparatus by, for example, reading out and performing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-060115 filed on Mar. 12, 2009, which is hereby incorporated by reference herein in its entirety.

What is claimed is:

1. An image forming apparatus comprising:

an upper layer control unit that controls the image forming apparatus which forms an image on a printing material; and first and second lower layer control units that are controlled by said upper layer control unit and respectively control first and second processing units for performing image formation, wherein said upper layer control unit is connected to said first and second lower layer control units by communication bus with a first communication speed, and said first lower layer control unit is connected to said first processing unit by a first serial communication line in a one-to-one manner having a communication speed higher than the first communication speed, and said second lower layer control unit is connected to said second processing unit by a second serial communication line in a one-to-one manner having a communication speed higher than the first communication speed.

2. The apparatus according to claim 1, wherein said upper layer control unit, said first and second lower layer control units, and said first and second processing units are located such that distances between said first and second lower layer control units and said first and second processing units are shorter than distances between said upper layer control unit and said first and second lower layer control units.

3. The apparatus according to claim 1, wherein the communication bus is one of a control area network communication bus, an inter-integrated circuit communication bus, and a local interconnect network communication bus.

4. An image forming apparatus comprising:

an upper layer control unit that controls the image forming apparatus which forms an image on a printing material; and first and second lower layer control units that are controlled by said upper layer control unit and respectively control first and second processing units for performing image formation, wherein said upper layer control unit is connected to said first and second lower layer control units by communication bus with a first communication speed, and said first lower layer control unit is connected to said first processing unit by a first serial communication line in a one-to-one manner having a communication speed higher than the first communication speed, and said second lower layer control unit is connected to said second processing unit by a second serial communication line in a one-to-one manner having a communication speed higher than the first communication speed, and said first lower layer control unit controls a feed function of feeding a printing material and said second lower layer control unit controls an image formation function of forming an image on a printing material.

5. The apparatus according to claim 4, wherein said first lower layer control unit performs control to feed a printing material to a registration roller, and said second lower layer control unit performs control to convey a printing material fed to the registration roller and form an image on the printing material.

* * * * *